(12) United States Patent
Cho et al.

(10) Patent No.: US 8,203,666 B2
(45) Date of Patent: Jun. 19, 2012

(54) BACKLIGHT ASSEMBLY, DISPLAY DEVICE HAVING THE BACKLIGHT ASSEMBLY AND METHOD OF MANUFACTURING THE SAME

(75) Inventors: Joo-Woan Cho, Asan-si (KR); Seon-Bae Kim, Asan-si (KR); Seong-Sik Choi, Seoul (KR); Yong-Woo Lee, Suwon-si (KR); Hyun-Chul Bae, Cheonan-si (KR); Du-Hwan Chung, Suwon-si (KR); Cheol-Yong Noh, Asan-si (KR); Chi-O Cho, Asan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 192 days.

(21) Appl. No.: 12/243,397

(22) Filed: Oct. 1, 2008

(65) Prior Publication Data
US 2009/0161036 A1    Jun. 25, 2009

(30) Foreign Application Priority Data
Dec. 21, 2007  (KR) ......................... 10-2007-0135003

(51) Int. Cl.
    *G02F 1/1333*  (2006.01)
(52) U.S. Cl. ............................................ 349/65; 349/58
(58) Field of Classification Search ............ 349/58, 349/65
    See application file for complete search history.

(56) References Cited

U.S. PATENT DOCUMENTS

| 5,046,826 A | * | 9/1991 | Iwamoto et al. | 349/65 |
| 5,600,455 A | * | 2/1997 | Ishikawa et al. | 349/57 |
| 2002/0176046 A1 | * | 11/2002 | Kitamura et al. | 349/153 |
| 2005/0135118 A1 | * | 6/2005 | Takata | 362/615 |
| 2007/0091588 A1 | * | 4/2007 | Hwang | 362/97 |
| 2009/0231506 A1 | * | 9/2009 | Takata | 349/58 |

FOREIGN PATENT DOCUMENTS

| JP | 2004-101693 | 4/2004 |
| KR | 1020070044337 A | 4/2007 |
| KR | 1020070044343 A | 4/2007 |

* cited by examiner

*Primary Examiner* — Eric Wong
(74) *Attorney, Agent, or Firm* — F. Chau & Associates, LLC

(57) ABSTRACT

In a method of manufacturing a backlight assembly, a light reflective and heat-radiating sheet including a light reflective sheet layer to reflect light and a heat-radiating sheet layer are prepared. The heat-radiating sheet layer includes a coupling layer integrally formed with a surface of the light reflective sheet layer and heat-diffusing particles are dispersed in the coupling layer to diffuse heat provided from the exterior. The light reflective and heat-radiating sheet is disposed so that the coupling layer is adhered to a bottom plate of a receiving container. Thus, impurities may be prevented and/or reduced, and assembling efficiency may be improved.

15 Claims, 6 Drawing Sheets

FIG. 8

| 37.6 | 38.7 | 39.1 |
|------|------|------|
| 37.5 | 38.5 | 38.7 |
| 33.9 | 34.7 | 35.8 |

| 39.4 | 38.5 | 39.6 |
|------|------|------|
| 38.5 | 38.4 | 38.6 |
| 32.7 | 32.7 | 33.3 |

~51

BACKLIGHT ASSEMBLY, DISPLAY DEVICE HAVING THE BACKLIGHT ASSEMBLY AND METHOD OF MANUFACTURING THE SAME

CROSS-REFERENCE TO RELATED APPLICATION

This application claims priority under 35 U.S.C. §119 to Korean Patent Application No. 2007-135003, filed on Dec. 21, 2007 in the Korean Intellectual Property Office (KIPO), the contents of which are herein incorporated by reference in their entirety.

BACKGROUND

1. Technical Field

The present disclosure relates to a backlight assembly, a display device having the backlight assembly, and a method of manufacturing the backlight assembly. More specifically, the present disclosure relates to a backlight assembly capable of efficiently radiating heat generated by a light source, a display device having the backlight assembly, and a method of manufacturing the backlight assembly.

2. Discussion of Related Art

In general, a digital information display (DID) needs high reliability to achieve its intended purpose. Because a liquid crystal display (LCD) device, which is one kind of DID, includes an LCD panel that is vulnerable to high temperature, controlling the temperature of the LCD device is important for the reliability of the LCD device.

Heat from the LCD device is mostly generated by a backlight assembly providing light to the LCD panel. Backlight assemblies that may be used for the LCD device may be divided into a direct downward-type backlight assembly and an edge-type backlight assembly, based on the deposition of a light source. A plurality of light sources is disposed under the display panel in the direct downward-type backlight assembly. The edge-type backlight assembly includes a light source disposed at a side of a light-guiding plate to provide light to the display panel.

One example of the light source that may be used for the backlight assembly is a cold cathode fluorescent lamp (CCFL). Another example is a light-emitting diode (LED) that has favorable characteristics, such as small volume, light weight, low power consumption, and the like.

Because the direct downward-type backlight assembly includes a number of light sources, the heat generated by the light sources needs to be externally radiated. When the heat generated by the light sources is not efficiently radiated, the temperature of the display device is increased, and an LCD panel is damaged, thereby causing problems such as discoloration, degradation of a liquid crystal, bruising of a liquid crystal, and the like. Furthermore, elements employed in the display device, for example, a mold frame, may be deformed or may be discolored, and an efficiency of the light source may be deteriorated.

Thus, a conventional DID device having a display part that is vulnerable to high temperature includes a heat spreader disposed under a light source to radiate heat generated by the light source. The heat spreader is disposed between a reflective sheet and a bottom plate of a receiving container, the reflective sheet reflecting light emitted from the light source, the receiving container receiving the light source. Examples of a conventional heat spreader include a graphite sheet, which has been found to be advantageous in spreading heat. The graphite sheet has a thickness of about 1 mm, and is disposed between the reflective sheet and the bottom plate of the receiving container.

The graphite sheet is manufactured, however, by compressing graphite powder at a high temperature under a high pressure. Thus, the graphite sheet is easily broken. Therefore, graphite powder may escape from a broken graphite sheet, and the graphite powder may serve as an unwanted impurity in a backlight assembly.

Furthermore, the graphite sheet barely makes complete contact with a bottom plate of a receiving container. Thus, an air layer may be formed between the graphite sheet and the bottom plate. This air layer hinders the graphite sheet from radiating heat.

Even if an impurity-blocking layer is formed on an upper surface of the graphite sheet, graphite powder may not be prevented from moving toward the liquid crystal display panel in view of the structure of a backlight assembly.

Furthermore, when a backlight assembly includes the impurity-blocking layer, an adhesive tape is required in order to couple the impurity-blocking layer to the reflective sheet. Thus, processes and costs for manufacturing the backlight assembly are increased.

Also, when a graphite sheet is once more adhered to a bottom plate of a receiving container after the graphite sheet has been removed from the bottom plate, graphite powder may be adhered to the bottom plate. Thus, both the receiving container and the graphite sheet may become unusable.

SUMMARY OF THE INVENTION

Exemplary embodiments of the present invention provide a method of manufacturing a backlight assembly that is capable of improving assembling efficiency and of preventing and/or reducing impurities.

Exemplary embodiments of the present invention also provide a backlight assembly capable of efficiently diffusing and/or radiating heat and of preventing and/or reducing impurities.

Exemplary embodiments of the present invention also provide a display device having the backlight assembly.

In an exemplary embodiment of the present invention, there is provided a method of manufacturing a backlight assembly. In the method, a reflective and heat-radiating sheet including a reflective sheet layer to reflect light and a heat-radiating sheet layer are prepared. The heat-radiating sheet layer includes a coupling layer integrally formed with a surface of the reflective sheet layer and heat-diffusing particles dispersed in the coupling layer to diffuse heat provided from the exterior. The coupling layer is adhesive. The reflective and heat-radiating sheet is disposed so that the coupling layer is adhered to a bottom plate of a receiving container. A plurality of light sources is disposed on the bottom plate adhered to the coupling layer of the reflective and heat-radiating sheet.

For example, the reflective sheet layer may be adhered to the heat-radiating sheet layer, or the heat-radiating sheet layer may be adhered to the reflective sheet layer, so as to prepare the reflective and heat-radiating sheet. Furthermore, the heat-diffusing particles may include ceramic particles, boron nitride particles, silicon carbide particles, and magnesium oxide particles, and the like. For example, a first adhesive layer may be formed to adhere an upper surface of the coupling layer to a surface of the reflective sheet layer, and a second adhesive layer may be formed to adhere a lower surface of the coupling layer to the bottom plate, so as to form the heat-radiating sheet layer. In an exemplary embodiment, the heat-radiating sheet layer may be disposed so that the first adhesive layer is exposed upwardly, and the reflective sheet layer wound on a roller sheet layer may be rolled on the first adhesive layer of the heat-radiating sheet layer to integrally form the reflective sheet layer and the heat-radiating sheet layer.

For example, the coupling layer may include a silicone resin and/or an acryl resin, and the like. Furthermore, the coupling layer may also include carbon particles. The reflective sheet layer may include polyethylene terephthalate and may have a microcellular structure.

In an exemplary embodiment of the present invention, a backlight assembly includes a receiving container, a plurality of light sources, and a reflective and heat-radiating sheet. The light sources are disposed on a bottom plate of the receiving container and serve to emit light. The reflective and heat-radiating sheet includes a reflective sheet layer and a heat-radiating sheet layer. The reflective sheet layer is disposed on the bottom plate and reflects the light emitted by the light sources. The heat-radiating sheet layer includes a coupling layer integrally formed with a lower surface of the reflective sheet layer and heat-diffusing particles are dispersed in the coupling layer. The coupling layer is adhered to the bottom plate. The heat-diffusing particles may include ceramic particles, boron nitride particles, silicon carbide particles, and magnesium oxide particles, and the like.

For example, the heat-radiating sheet layer may include a first adhesive layer and a second adhesive layer. The first adhesive layer adheres an upper surface of the coupling layer to a lower surface of the reflective sheet layer. The coupling layer may include a silicone resin and/or an acryl resin, and the like. Furthermore, the coupling layer may also include carbon particles. The reflective sheet layer may include polyethylene terephthalate and may have a microcellular structure. The reflective and heat-radiating sheet may be extended to a sidewall of the receiving container and may be adhered to the sidewall of the receiving container.

In an exemplary embodiment of the present invention, a display device includes a receiving container, a plurality of lamps, a reflective and heat-radiating sheet, an optical member, and a display panel. The lamps are disposed on a bottom plate of the receiving container and serve to emit light. The reflective and heat-radiating sheet includes a reflective sheet layer and a heat-radiating sheet layer. The reflective sheet layer is disposed on the bottom plate and reflects the light emitted by the lamps. The heat-radiating sheet layer includes an adhesive tape and heat-diffusing particles dispersed in the adhesive tape. The adhesive tape is interposed between the bottom plate and the reflective sheet layer to adhere the reflective sheet layer to the bottom plate. The heat-diffusing particles may include ceramic particles, boron nitride particles, silicon carbide particles, and magnesium oxide particles, and the like. The optical member is disposed on the lamps, and the display panel is disposed on the optical member.

The adhesive tape may include a silicone resin and/or an acryl resin, and the like. Furthermore, the reflective sheet layer may include polyethylene terephthalate and may have a microcellular structure.

According to the above, a backlight assembly, a display device having the backlight assembly and a method of manufacturing the backlight assembly according to exemplary embodiments of the present invention may prevent impurities from escaping from a reflective and heat-radiating sheet and may improve efficiencies of radiating heat and assembling a device.

BRIEF DESCRIPTION OF THE DRAWINGS

Exemplary embodiments of the present invention will be understood in more detail from the following descriptions taken in conjunction with the accompanying drawings, wherein:

FIG. 8 is a plan view of a bottom plate illustrating a temperature distribution for the bottom plate of a receiving container when the bottom plate includes a graphite sheet and a reflective sheet; and FIG. 9 is a plan view of a bottom plate illustrating a temperature distribution for the bottom plate of a receiving container when the bottom plate includes a reflective and heat-radiating sheet according to an exemplary embodiment of the present invention.

DESCRIPTION OF EXEMPLARY EMBODIMENTS

Figure 1:
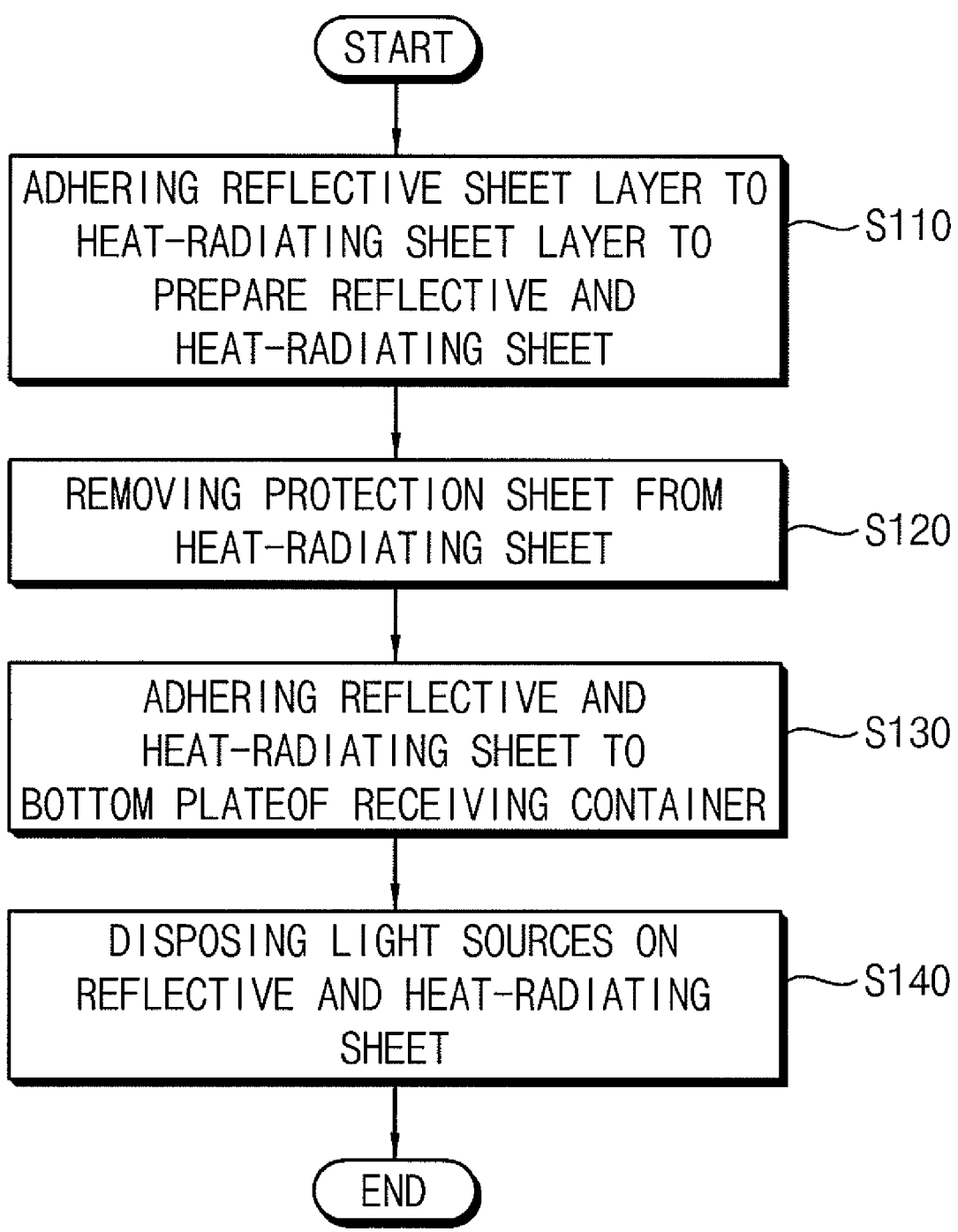
FIG. 1 is a flowchart illustrating a method of manufacturing a backlight assembly according to an exemplary embodiment of the present invention.

The present invention is described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those of ordinary skill in the art. In the drawings, the size and relative sizes of layers and regions may be exaggerated for clarity.

FIG. 1 is a flowchart illustrating a method of manufacturing a backlight assembly according to an exemplary embodiment of the present invention.

Referring to FIG. 1, a reflective and heat-radiating sheet including a reflective sheet layer and a heat-radiating sheet layer is manufactured (Step S110). The reflective sheet layer reflects light, and the heat-radiating sheet layer includes a coupling layer and heat-diffusing particles. The coupling layer has an adhesive characteristic, and is integrally formed with a surface of the reflective sheet layer. The heat-diffusing particles are dispersed in the coupling layer. The heat-diffusing particles uniformly diffuse heat provided from the exterior in the coupling layer and radiate the heat outwardly. Furthermore, a protective layer or protective sheet may be formed on a surface of the coupling layer.

Thereafter, the protective sheet may be removed from the coupling layer (Step S120).

The reflective and heat-radiating sheet are then disposed so that the coupling layer is adhered to a bottom layer of a receiving container (Step S130).

Then, a plurality of light sources is disposed on the bottom plate combined with the reflective and heat-radiating sheet (Step S140). The light sources serve to emit light.

Figure 2:
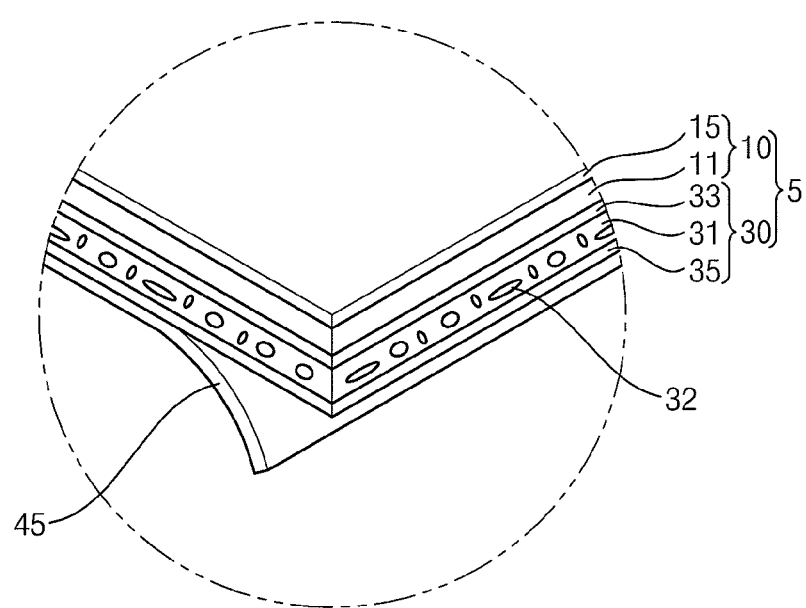
FIG. 2 is a partial perspective view illustrating a reflective and heat-radiating sheet of a backlight assembly according to an exemplary embodiment of the present invention.
Figure 3:
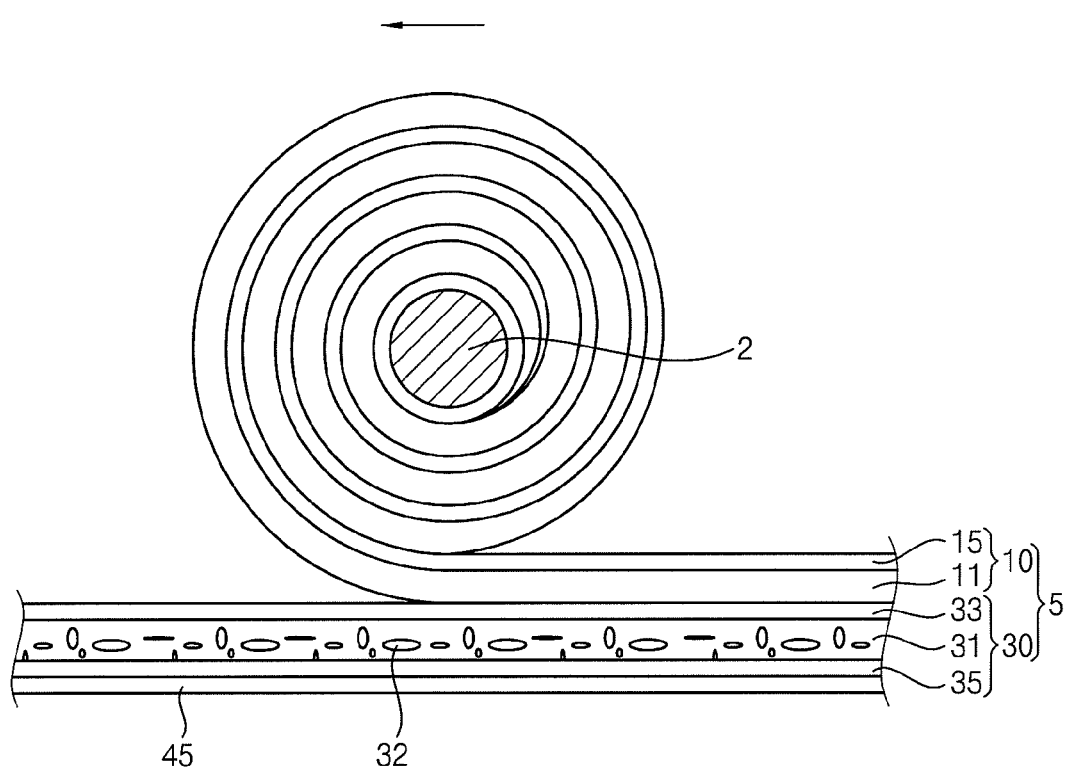
FIG. 3 is a cross-sectional view illustrating a method of manufacturing a reflective and heat-radiating sheet of a backlight assembly according to an exemplary embodiment of the present invention.

FIG. 2 is a partial perspective view illustrating a reflective and heat-radiating sheet of a backlight assembly according to an exemplary embodiment of the present invention. FIG. 3 is a cross-sectional view illustrating a method of manufacturing a reflective and heat-radiating sheet of a backlight assembly according to an exemplary embodiment of the present invention.

Referring to FIGS. 2 and 3, a reflective and heat-radiating sheet 5 is prepared. The method of preparing the reflective and heat-radiating sheet 5 may include a process of adhering a reflective sheet layer 10 to a heat-radiating sheet layer 30 or adhering the heat-radiating sheet layer 30 to the reflective sheet layer 10.

The reflective sheet layer 10 may include a base layer 11 and a reflective layer 15.

The base layer 11 may include a resin, and examples of materials that may be used for the base layer 11 include polyethylene terephthalate (PET), polymethyl methacrylate (PMMA), and the like.

The reflective layer 15 may be formed on an upper surface of the base layer 11 and may include metal. An example of the metal is aluminum. Alternatively, the reflective layer 15 may include a non-metallic material. Furthermore, the reflective layer 15 may include a microcellular structure that may be formed from PET so as to diffuse light. The microcellular structure may include a plurality of pores having a diameter of about 10 μm that are densely formed adjacent a surface of a PET resin layer.

The method of preparing the reflective and heat-radiating sheet 5 may further include a process of forming a heat-radiating sheet layer 30 including a coupling layer 31. The coupling layer 31 includes heat-diffusing particles 32 dispersed therein. The heat-diffusing particles 32 uniformly diffuse heat provided from the exterior in the heat-radiating sheet layer 30 and radiate the heat outwardly from the heat-radiating sheet layer 30.

Examples of the heat-diffusing particles 32 may include ceramic particles, boron nitride (BN) particles, silicon carbide (SiC) particles, magnesium oxide (MgO) particles, and the like. These particles can be used alone or in combinations thereof.

For example, a BN particle may have an electric resistance of about 2028 ohm·cm and a thermal conductivity of about 400 W/mK, a SiC particle may have an electric resistance of about 105 ohm·cm and a thermal conductivity of about 300 W/mK, and a MgO particle may have an electric resistance of about 109 ohm·cm and a thermal conductivity of about 200 W/mK. Thus, the heat-radiating sheet layer 30 including the heat-diffusing particles 32 may have a thermal conductivity of about 2 to about 6 W/mK, for example.

A graphite particle may have a thermal conductivity of about 400 W/mK, however, an electric resistance of the graphite particles is very small, only about 0.006 ohm·cm.

The heat-diffusing particles 32 have excellent electrical insulation characteristics so that the heat-radiating sheet layer 30 may be improved in that regard. Thus, when the reflective and heat-radiating sheet 5 is disposed adjacent an electric device, such as a lamp, an improved electrical stability of the device may be achieved.

The heat-diffusing particles 32 have a thermal conductivity less than or equal to graphite particles however, the heat-diffusing particles 32 alone may sufficiently serve to diffuse and radiate heat. The heat-diffusing particles 32 may not be easily broken, unlike graphite particles, and may not easily escape from the heat-radiating sheet layer 30. Thus, when the heat-radiating sheet layer 30 includes the heat-diffusing particles 32, the heat-radiating sheet layer 30 may have the above-mentioned advantages when compared to graphite particles.

A method of forming the heat-radiating sheet layer 30 may include forming the coupling layer 31 by using a silicone resin, an acryl resin, and the like. Examples of materials for the coupling layer 31 may include a silicone resin, an acryl resin, and the like. The coupling layer 31 fixes the heat-diffusing particles 32. Alternatively, the coupling layer 31 may include a polyester resin, a urethane resin, an epoxy resin, and the like.

The heat-radiating sheet layer 30 may further include a first adhesive layer 33 and a second adhesive layer 35.

The first adhesive layer 33 is interposed between a lower surface of the base layer 11 and an upper surface of the coupling layer 31 to combine the lower surface of the base layer 11 and the upper surface of the coupling layer 31 with each other. The second adhesive layer 35 is adhered to a lower surface of the coupling layer 31. For example, an adhesive member is respectively coated on the lower surface and the upper surface of the coupling layer 31 to form the first and second adhesive layers 33 and 35. A thickness of the first and second adhesive layers 33 and 35 is very thin when compared to that of the coupling layer 31. Thus, the first and second adhesive layers 33 and 35 hardly affect the thermal conductivity of the heat-radiating sheet layer 30.

A protective sheet 45 is formed on the second adhesive layer 35 to protect the second adhesive layer 35 until the reflective and heat-radiating sheet 5 is combined with the bottom plate of the receiving container.

Referring to FIG. 3, the heat-radiating sheet layer 30 is disposed so that the first adhesive layer 33 is exposed upwardly, and the reflective sheet layer 10 wound around a roller 2 may be rolled on the first adhesive layer 33 of the heat-radiating sheet layer 30 using the roller 2. Accordingly, the lower surface of the base layer 11 of the reflective sheet layer 10 is adhered to the first adhesive layer 33. According to the above, the reflective and heat-radiating sheet 5 including the reflective sheet layer 10 and heat-radiating sheet layer 30, which are integrally formed, may be prepared.

Alternatively, the reflective sheet layer 10 is disposed so that the base layer 11 is exposed upwardly, and the heat-radiating sheet layer 30 wound around the roller 2 may be rolled on the base layer 11 using the roller 2. Alternatively, the reflective sheet layer 10 and the heat-radiating sheet layer 30 may be combined upon being unrolled.

Figure 4:
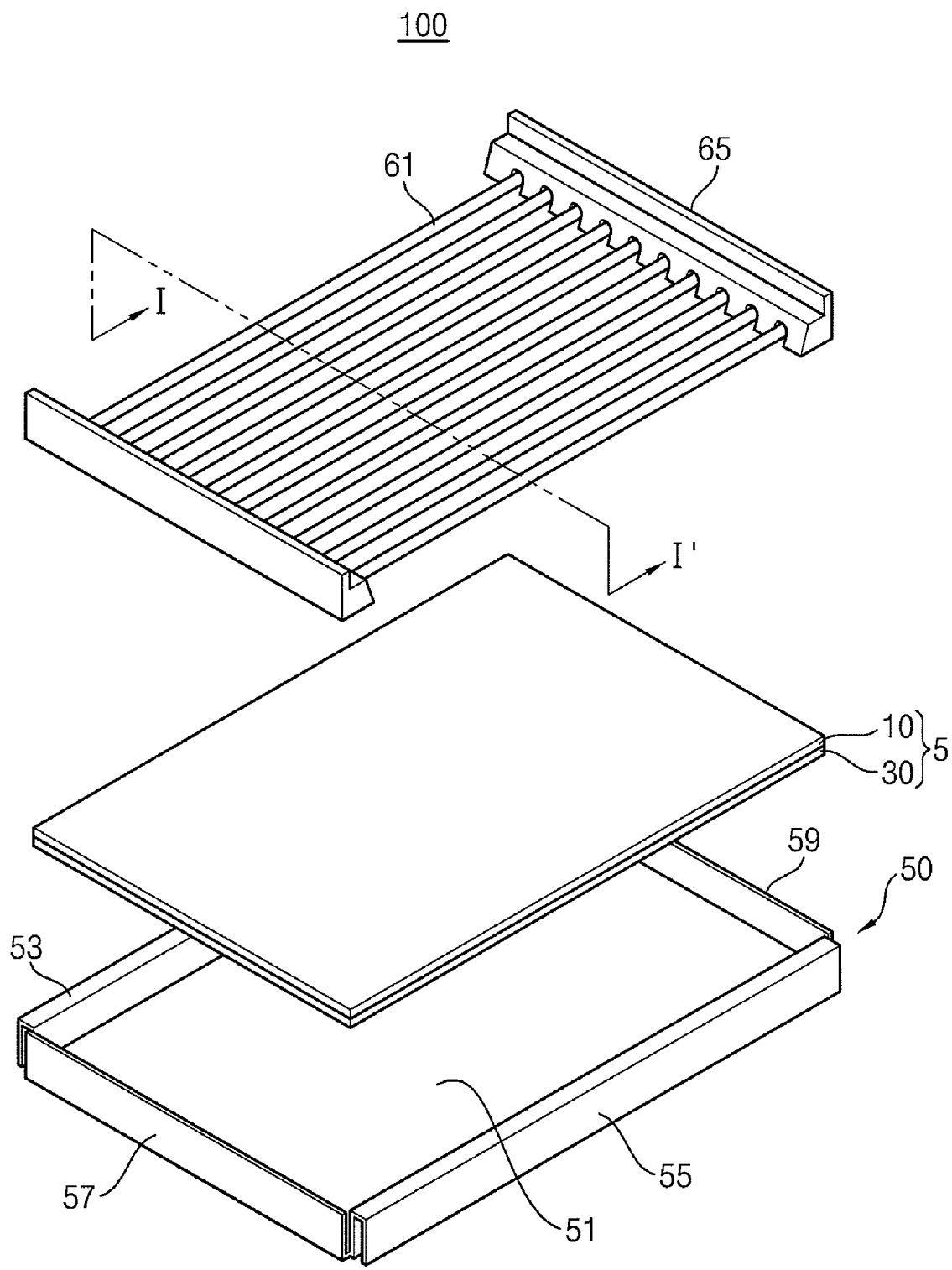
FIG. 4 is an exploded perspective view illustrating a backlight assembly according to an exemplary embodiment of the present invention.

FIG. 4 is an exploded perspective view illustrating a backlight assembly according to an exemplary embodiment of the present invention.

Referring to FIG. 4, a backlight assembly 100 includes a receiving container 50, a plurality of individual light sources 61, and a light reflective and heat-radiating sheet 5. The light reflective and heat-radiating sheet 5 may be substantially the same as the light reflective and heat-radiating sheet explained in connection with FIGS. 2 and 3.

The receiving container 50 includes a bottom plate 51, a first sidewall 53, a second sidewall 55, a third sidewall 57 and a fourth sidewall 59. The first and second sidewalls 53 and 55 face each other. The third and fourth sidewalls 57 and 59 face each other and connect the first sidewall 51 to the second sidewall 53. An example of the receiving container 50 is a metallic chassis.

The light sources 61 are disposed on the bottom plate 51 and serve to emit light. Examples of the light sources 61 may include elongated lamps, and, alternatively, the light sources 61 may include light-emitting diodes (LED). The lamps 61 are disposed to extend to the fourth sidewall 59 from the third sidewall 57.

The backlight assembly 100 may further include side moldings 65. For example, the side moldings 65 may be respectively disposed adjacent both ends of the lamps 61. The side moldings 65 protect the electrode portions of the lamps 61.

The protective sheet 45 shown in FIG. 2 that is adhered to the second adhesive layer 35 of the light reflective and heat-radiating sheet 5 is removed upon installation into the receiving container 50.

Figure 5:
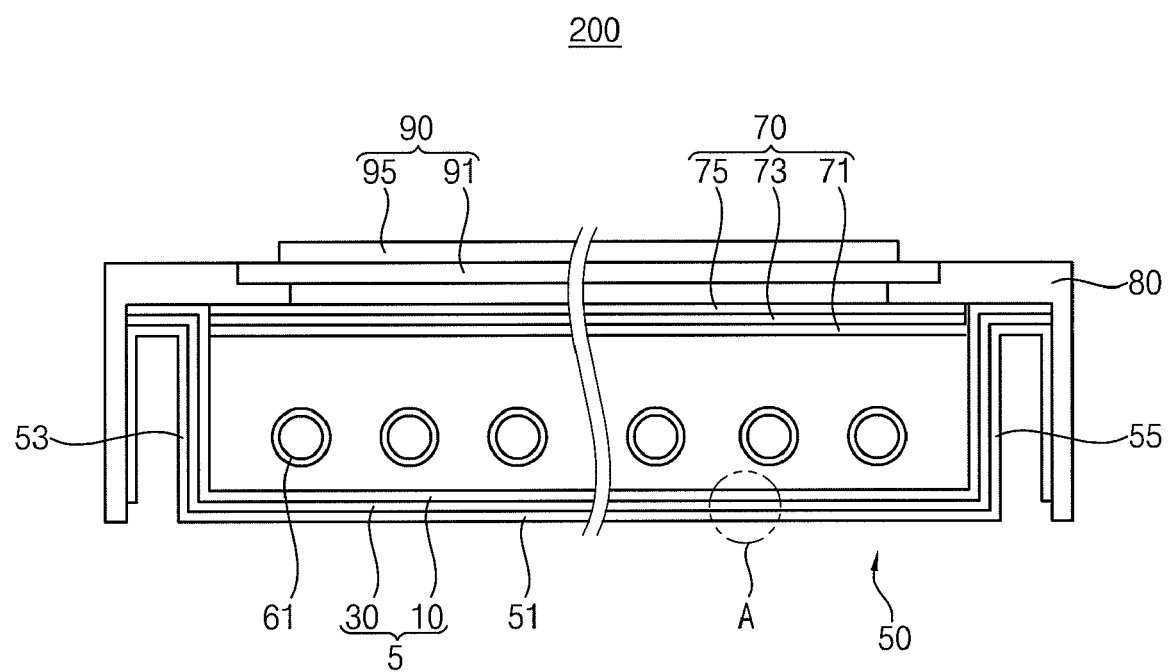
FIG. 5 is a cross-sectional view illustrating a display device according to an exemplary embodiment of the present invention.

FIG. 5 is a cross-sectional elevational view illustrating a display device according to an exemplary embodiment of the present invention. More specifically, FIG. 5 is a cross-sectional view illustrating a display device including an optical member, a display panel and the backlight assembly of FIG. 4, which is taken at line I-I'.

Referring to FIG. 5, a display device 200 includes a receiving container 50, a plurality of light sources 61, a light reflective and heat-radiating sheet 5, an optical member 70, a middle molding 80, and a display panel 90.

After the protective sheet 45 has been removed, the reflective and heat-radiating sheet 5 is disposed on the bottom plate 51 so that the second adhesive layer 35 shown in FIG. 2 is adhered to the bottom plate 51. The light reflective and heat-radiating sheet 5 may extend to the first and second sidewalls 53 and 55 of the receiving container 50.

The optical member 70 is disposed on a stepped portion formed at an upper surface of the side molding 65, as seen in FIG. 4. The optical member 70 may include a diffusion plate 71, a diffusion sheet 73, and a condensing sheet 75, which are sequentially deposited.

The middle molding 80 secures an edge of the optical member and is combined with receiving the container 50. The display panel 90 includes a lower substrate 91 and an upper substrate 95. The display panel 90 is disposed on the middle molding 80, and displays an image based on light exiting from the optical member 70.

Figure 6:
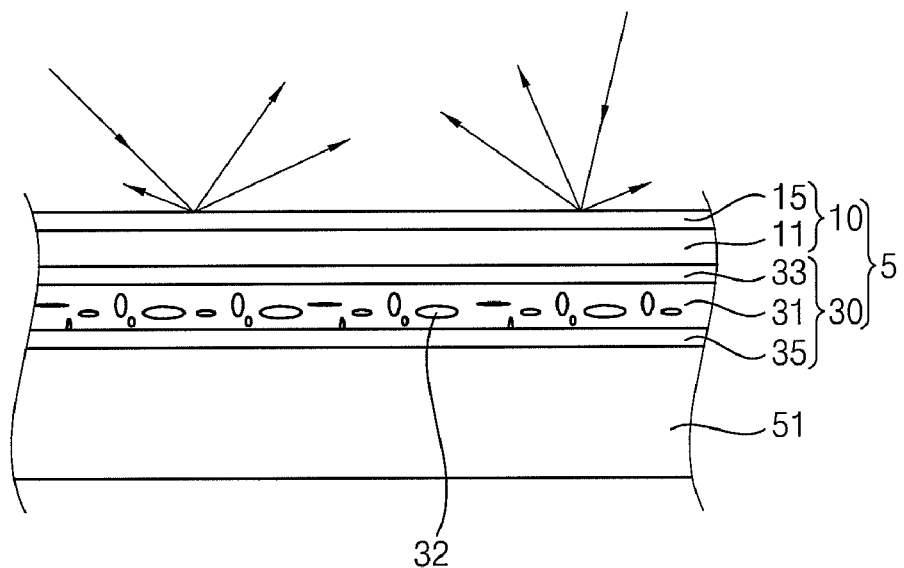
FIG. 6 is an enlarged view illustrating a first region of the display device illustrated in FIG. 5.

FIG. 6 is an enlarged view illustrating a first region A of the display device illustrated in FIG. 5.

Referring to FIG. 6, a cross-section of the bottom plate 51 and the light reflective and heat-radiating sheet 5 of the first region A is illustrated. The second adhesive layer 35 is adhered to the bottom plate 51 to make close contact with the bottom plate 51. Thus, an air layer is not formed between the bottom plate 51 and the second adhesive layer 35. Furthermore, the first adhesive layer 22 is integrally formed with the base layer 11 of the reflective sheet layer 10.

Light emitted by the lamps 61 is reflected by a reflective layer 15. The reflective layer 15 reflects and scatters the light. Thus, the light is diffused and reflected by the reflective layer 15.

An appreciable amount of heat is generated when the lamps 61 emit light. The heat mostly passes through the heat-radiating sheet layer 30, and is radiated outwardly through the bottom plate 51. Particles 32 in the heat-radiating sheet layer 30 diffuse the heat to keep the temperature of the bottom plate 51 uniform and to prevent the temperature of a portion of the bottom plate 51 from critically increasing.

Figure 7:
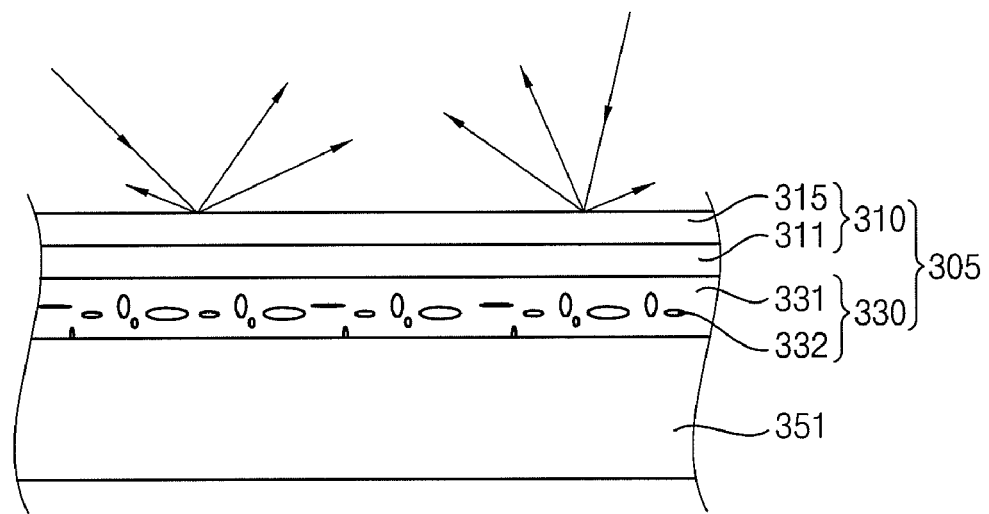
FIG. 7 is an enlarged view illustrating a first region of a display device according to an exemplary embodiment of the present invention.

FIG. 7 is an enlarged view illustrating a first region of a display device similar to region A according to an exemplary embodiment of the present invention.

Referring to FIG. 7, a reflective and heat-radiating sheet 305 of a display device may be substantially the same as the reflective and heat-radiating sheet 5 illustrated in FIGS. 1 to 6 except for a heat-radiating sheet layer 330.

In an exemplary embodiment, the first adhesive layer and second adhesive layer are omitted. Thus, the heat-radiating sheet layer 330 includes only a coupling layer 331 and heat-diffusing particles 332 dispersed in the coupling layer 331.

The coupling layer 331 has an adhesive characteristic. Thus, an upper surface of the coupling layer 331 may be integrally formed with a lower surface of a base layer 311. A lower surface of the coupling layer 331 may be adhered to a bottom plate 351 of a receiving container.

In an exemplary embodiment, an example of the coupling layer 331 is an adhesive tape, and the coupling layer 331 may further include carbon particles. In this exemplary embodiment, the carbon particles do not escape from the coupling layer 331 as do the graphite particles. Furthermore, the carbon particles may improve a thermal conductivity of the heat-radiating sheet layer 330. The heat-radiating sheet layer 330 including the carbon particles may be referred to as a carbon tape.

FIG. 8 is a plan view of a bottom plate 51 illustrating a temperature distribution for the bottom plate 51 of a receiving container 50 (not shown) when the bottom plate 51 includes a graphite sheet and a reflective sheet. FIG. 9 is a plan view of a bottom plate 51 illustrating a temperature distribution for the bottom plate 51 of a receiving container 50 (not shown) when the bottom plate 51 includes a reflective and heat-radiating sheet according to an exemplary embodiment of the present invention.

Referring to FIGS. 8 and 9, comparing a temperature distribution for a bottom plate 51 of a receiving container including a graphite sheet and a reflective sheet, which are disposed on the bottom plate 51, to a temperature distribution for a bottom plate 51 of a receiving container including a reflective and heat-radiating sheet having a reflective sheet layer and a heat-radiating sheet layer, which are integrally formed, a difference between the temperature distributions ranges from about +1.8° C. to about −2.5° C. depending on a location on the bottom plate. Thus, both receiving containers may be substantially equal in terms of heat-radiation. The reflective and heat-radiating sheet according to an exemplary embodiment of the present invention, however, does not cause impurities such as graphite particles. Furthermore, the reflective and heat-radiating sheet may be easily adhered to the bottom plate after removing a protective sheet. Thus, it will be seen that the reflective and heat-radiating sheet may improve assembling efficiencies of a backlight assembly and a display device.

According to the above, a backlight assembly, a display device having the backlight assembly and a method of manufacturing the backlight assembly according to exemplary embodiments of the present invention may improve efficiencies of radiating heat and assembling a device.

Although exemplary embodiments of the present invention have been described, it is understood that the present invention should not be limited to these exemplary embodiments but various changes and modifications can be made by one ordinary of ordinary skill in the art within the spirit and scope of the present invention, as hereinafter claimed.

What is claimed is:

1. A method of manufacturing a backlight assembly, the method comprising:

preparing a light reflective and heat-radiating sheet including a light reflective sheet layer to reflect light and a heat-radiating sheet layer including a coupling layer integrally formed with a surface of the light reflective sheet layer and, having heat-diffusing particles dispersed in the coupling layer to diffuse heat provided from an exterior, the coupling layer having adhesive layers thereon;

disposing the light reflective and heat-radiating sheet so that the coupling layer is adhered to a bottom plate and sidewalls of a receiving container; and disposing a plurality of light sources on the bottom plate having the coupling layer of the light reflective and heat-radiating sheet adhered thereto, wherein preparing the light reflective and heat-radiating sheet comprises forming the heat-radiating sheet layer, wherein the heat-diffusing particles comprise at least one selected from the group consisting of boron nitride particles, silicon carbide particles, and magnesium oxide particles, and wherein forming the heat-radiating sheet layer comprises forming a first adhesive layer of the adhesive layers to adhere an upper surface of the coupling layer to a surface of the light reflective sheet layer.

2. The method of claim 1, wherein preparing the light reflective and heat-radiating sheet comprises one of adhering the light reflective sheet layer to the heat-radiating sheet layer and adhering the heat-radiating sheet layer to the light reflective sheet layer.

3. The method of claim 1, wherein forming the heat-radiating sheet layer further comprises forming a second adhesive layer to adhere a lower surface of the coupling layer to the bottom plate.

4. The method of claim 1, wherein preparing the light reflective and heat-radiating sheet further comprises:
disposing the heat-radiating sheet layer so that the first adhesive layer is exposed upwardly; and
rolling the light reflective sheet layer on the first adhesive layer of the heat-radiating sheet layer, the light reflective sheet layer being wound on a roller, to integrally form the light reflective sheet layer and the heat-radiating sheet layer.

5. The method of claim 2, wherein the coupling layer comprises at least one selected from the group consisting of a silicone resin and an acryl resin.

6. The method of claim 2, wherein the coupling layer further comprises carbon particles.

7. The method of claim 2, wherein the light reflective sheet layer comprises polyethylene terephthalate and has a microcellular structure.

8. A backlight assembly comprising:
a receiving container having a bottom plate and sidewalls;
a plurality of light sources disposed on the bottom plate of the receiving container to emit a light;
a light reflective and heat-radiating sheet disposed on the bottom plate and sidewalls and arranged between the plurality of light sources and the bottom plate, the light reflective and heat-radiating sheet including a light reflective sheet layer disposed on the bottom plate and a heat-radiating sheet layer disposed between the light reflective sheet layer and the bottom plate and sidewalls, the light reflective sheet layer reflecting the light emitted by the plurality of light sources, the heat-radiating sheet layer comprising a coupling layer integrally formed with a lower surface of the reflective sheet layer and having heat-diffusing particles dispersed in the coupling layer, the heat-diffusing particles including at least one selected from the group consisting of boron nitride particles, silicon carbide particles, and magnesium oxide particles,
wherein the heat-radiating sheet layer further comprises a first adhesive layer to adhere an upper surface of the coupling layer to the lower surface of the light reflective sheet layer.

9. The backlight assembly of claim 8, wherein the heat-radiating sheet layer further comprises a second adhesive layer to adhere a lower surface of the coupling layer to the bottom plate.

10. The backlight assembly of claim 9, wherein the coupling layer comprises at least one selected from the group consisting of a silicone resin and an acryl resin.

11. The backlight assembly of claim 9, wherein the coupling layer further comprises carbon particles.

12. The backlight assembly of claim 8, wherein the light reflective sheet layer comprises polyethylene terephthalate and has a microcellular structure.

13. A display device comprising:
a receiving container having a bottom plate and sidewalls;
a plurality of lamps disposed on a bottom plate of the receiving container to emit light;
a light reflective and heat-radiating sheet disposed on the bottom plate and sidewalls and arranged between the plurality of lamps and the bottom plate, the light reflective and heat-radiating sheet including a light reflective sheet layer disposed on the bottom plate and sidewalls and a heat-radiating sheet layer disposed between the reflective sheet layer and the bottom plate and sidewalls, the light reflective sheet layer reflecting the light emitted by the plurality of lamps, the heat-radiating sheet layer including an adhesive tape adhering both to the reflective sheet layer and to the bottom plate and sidewalls and having heat-diffusing particles dispersed in the adhesive tape, the heat-diffusing particles including at least one selected from the group consisting of boron nitride particles, silicon carbide particles, and magnesium oxide particles;
an optical member disposed on the plurality of lamps; and
a display panel disposed on the optical member.

14. The display device of claim 13, wherein the adhesive tape comprises at least one selected from the group consisting of a silicone resin and an acryl resin.

15. The display device of claim 13, wherein the light reflective sheet layer comprises polyethylene terephthalate and has a microcellular structure.

* * * * *